E. E. PHINNEY.
CALCULATING MACHINE.
APPLICATION FILED JUNE 3, 1919. RENEWED DEC. 21, 1920.
1,432,256.
Patented Oct. 17, 1922.
3 SHEETS—SHEET 3.
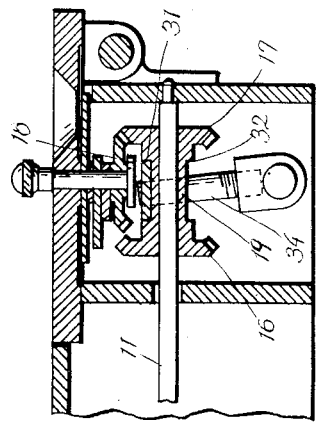
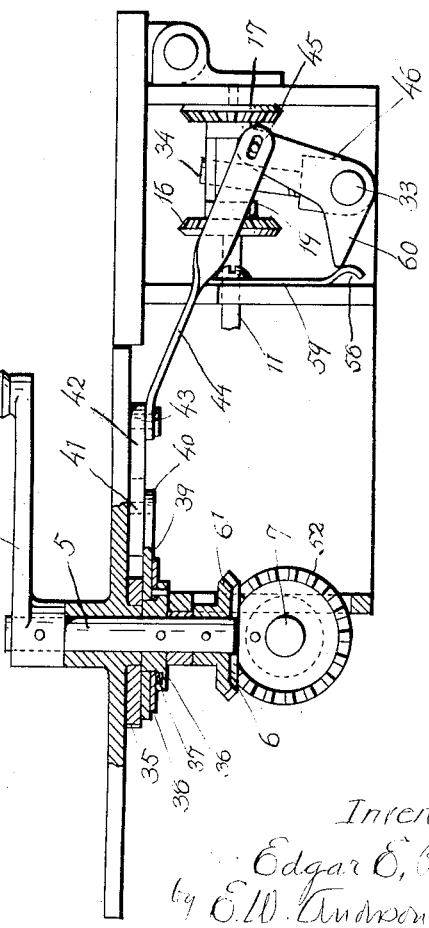

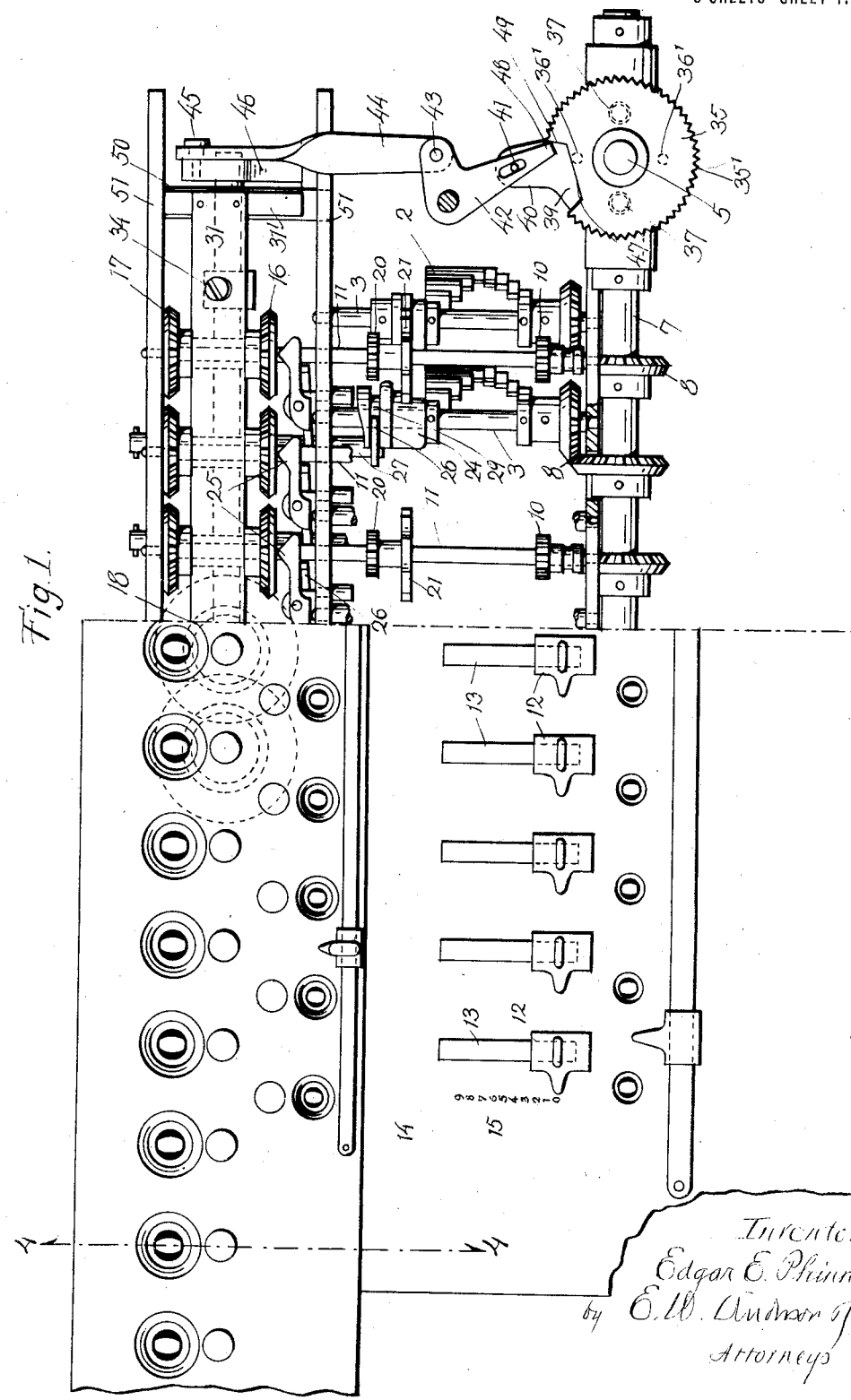

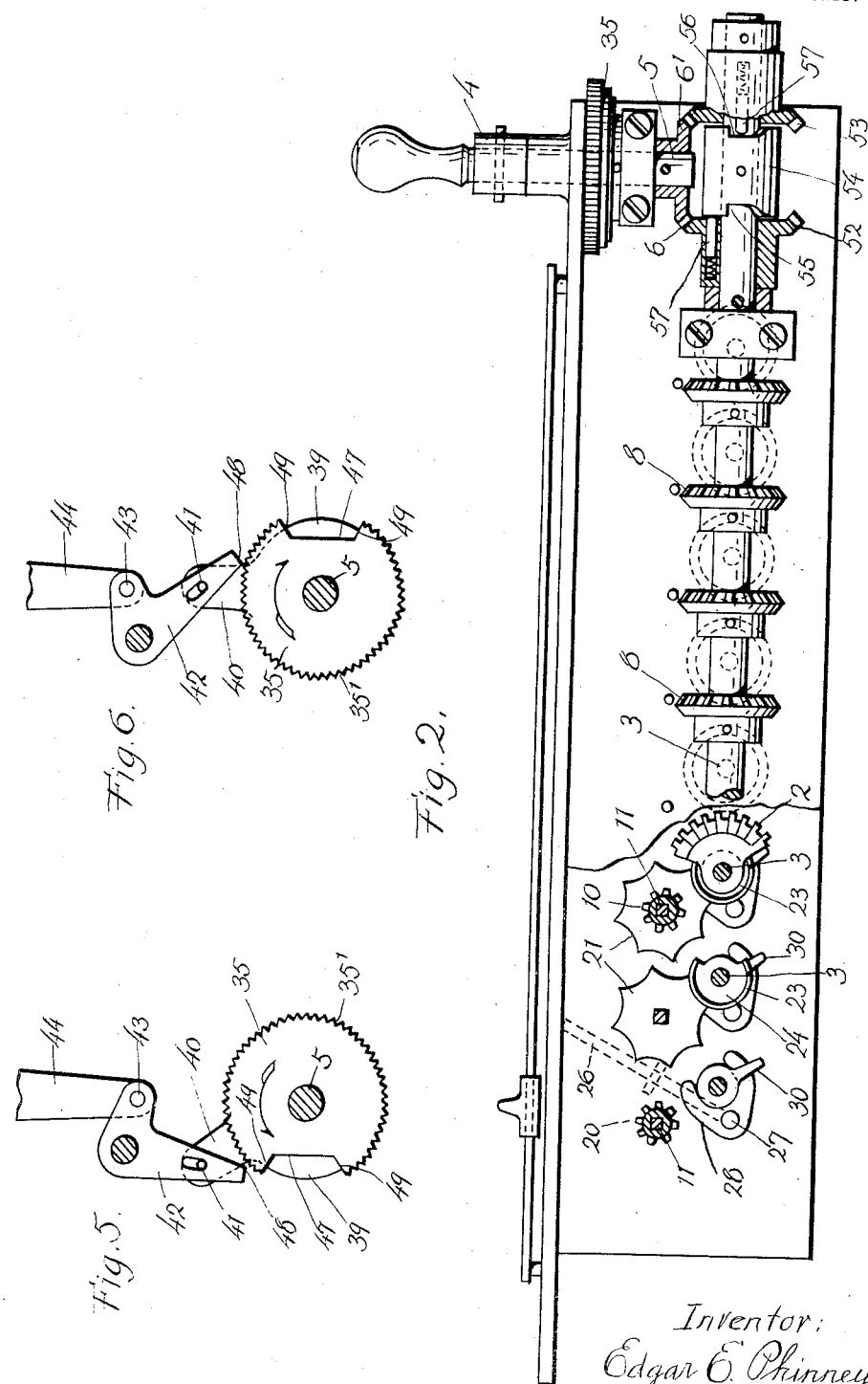

Patented Oct. 17, 1922.

1,432,256

UNITED STATES PATENT OFFICE.

EDGAR E. PHINNEY, OF WEST ORANGE, NEW JERSEY, ASSIGNOR TO MONROE CALCULATING MACHINE COMPANY, OF ORANGE, NEW JERSEY, A CORPORATION OF NEW YORK.

CALCULATING MACHINE.

Application filed June 3, 1919, Serial No. 301,477. Renewed December 21, 1920. Serial No. 432,302.

*To all whom it may concern:*

Be it known that I, EDGAR E. PHINNEY, a citizen of the United States, resident of West Orange, in the county of Essex and State of New Jersey, have made a certain new and useful Invention in Calculating Machines; and I declare the following to be a full, clear, and exact description of the same, such as will enable others skilled in the art to which it appertains to make and use the invention, reference being had to the accompanying drawings, and to letters or figures of reference marked thereon, which form a part of this specification.

Figure 1 is a plan view of the invention, partly broken away.

Figure 2 is a front view of the invention partly broken away.

Figure 3 is an end view of the invention with parts broken away.

Figure 4 is a section on the line 4—4, Figure 1.

Figures 5 and 6 are detail views showing opposite positions of the bell lever with relation to the reversing wheel.

The invention has relation to calculating machines, having for an object to provide a simplified operating mechanism for machines of the key-set type, wherein the number wheels or dials are rotated in opposite directions in performing opposite problems, as addition and subtraction. Another object is to automatically reverse the rotation of the dials in those key-set machines wherein the setting-up mechanism and the carry mechanism always rotate in the same direction. Another object is to reverse the rotation of the dials in such a machine by a reversion of the movement or rotation of an operating device or crank handle. Other objects and advantages will hereinafter appear.

The invention consists in the novel construction and combinations of parts, as hereinafter set forth.

In the accompanying drawings, illustrating the invention as applied to a machine constructed in accordance with the patents to Graber, of Oct. 11, 1910, and Apr. 23, 1912, Numbers 972,360, and 1,023,839, the numerals 2, 2 designate selecting elements having each nine teeth of proportionately different length, said elements being mounted upon shafts 3, to rotate therewith, said shafts being adapted to be simultaneously rotated in the same direction by means of a crank 4, fast upon a vertical shaft 5, the latter being connected by a bevel gear 6 with a longitudinal shaft 7, and the last named shaft having bevel gear connection 8 with the selector shafts 3.

Ten-toothed pinions 10 are slidably mounted upon shafts 11, to rotate therewith, said pinions in setting up being slidably adjusted upon their shafts by means of manually operable index slides 12, working in slots 13 of the cover plate 14 and adapted to register with the digital numbers 15 marked upon said plate. In this way a complete rotation of the operating crank 4 will cause a complete rotation of each of the selector shafts 3, thereby rotating the pinions to an extent or a number of teeth depending upon the adjustment or setting of the respective pinions with relation to the selecting elements cooperating therewith. The number wheels or dials will be correspondingly rotated by either of the bevel gears 16, 17, respectively engaging bevel gear 18 of the respective dial, said gears being fast to sleeve 19, slidably mounted upon shaft 11 to rotate therewith. The shafts 11 are provided with ten-toothed wheels 20 and scalloped disks 21, integral therewith, the concavities or scallops being respectively engaged by the arcuate portion 23 of a mutilated barrel 24, the disk 21 and barrel 24 constituting a Geneva movement.

In the carrying operation a tappet or lug of the number wheel or dial engages cam lever 25, there being one lever for each dial, thereby operating upstanding lever 26, to move reciprocatory rod 27 in one direction, said rod, through fork 28, engaging a groove 29 of the barrel 24 related to the next higher number wheel or dial and shifting said barrel in one direction, so that a projection or tooth 30 of the barrel will be brought into position to engage the related pinion 20, thereby rotating the higher order wheel one tooth for each rotation of the lower order wheel.

A shifting bar 31 extends transversely of the machine in engagement with annular grooves 32 of the sleeves 19, a transverse rock shaft 33, having end crank arms 34, engaging the said shifting bar and serving when rocked to move the same to one side or the other, and to thereby engage either the gear 16 or the gear 17 with the dial gear 18 when it is required to reverse the dial movement.

The preferable embodiment of the invention, as applied to the said Graber machine, is as follows:

The operating shaft is provided with a reversing wheel 35 (hereinafter described), fast thereto, and with a fast collar 36, the latter having seated therein coiled springs 37, bearing against a washer 38. The collar has lateral pins 36', engaging recesses of the washer, whereby the latter is made rotatably fast to the collar and admitting of a slight lateral movement of the washer, under pressure of the springs 37. A disk 39 is located between the washer and the reversing wheel, and is pressed by the washer into close frictional contact with said wheel, with which it has a tendency to and does rotate to the extent to be explained. The disk 39 has a crank extension 40, provided with a slot and pin connection 41 with a bell lever 42, the other arm of said bell lever having a pivotal connection 43 with one end of a connecting rod or link 44, said link having at its other end a slot and pin connection 45 with a rock lever 46, fast to the rock shaft 33. The reversing wheel has a circumferential notch 47, of sufficient extent to admit of the passage of the tail end 48 of said lever therethrough in the pivotal movement of the lever, said tail end being adapted to contact with either of the opposite radially disposed end walls 49 of said notch.

A problem of one kind, as in addition, having been performed by rotation of the operating shaft in one direction, and it being desired to subtract, the said shaft is rotated reversely, the spring-pressed disk 39 being carried around therewith through its frictional engagement with the reversing wheel, and moving the bell lever 42 from the position shown in Figure 5 to the position shown in Figure 6, or until the tail end of the bell lever has entered the notch 47 of said wheel. The movement of the operating shaft being continued, the bell lever is now positively moved by the end wall 49 of the notch of the reversing wheel rotating with the shaft, and will be thrown to a tangential position, or to a position of inclination with relation to the reversing wheel, opposite to the position shown in Figure 6, or to the position shown in Figure 5, the frictional engagement of the disk 39 with the reversing wheel then acting again to continue the movement of the bell lever until the end 48 of said lever is just out of contact with the teeth of the reversing wheel, when the pin of the connection 41 will strike the end of the slot of said connection and limit the movement in this direction.

The bell lever 42, in moving from the tangential position shown in Figure 6 to the opposite tangential position shown in Figure 5, passes through an arc of about 45 degrees, plus, thereby exerting an endwise pull upon the link 44 and rocking the lever 46 and the shaft 33, to shift the sleeves 19 and change the direction of rotation of the number wheels. The end portions of the transverse bar 31 have crossarms 31', sliding upon frame members 50, and at the end of the shifting movement abutting against frame members 51 to limit the movement.

The subtraction being completed, and it being desired to add, the operating shaft is again reversed in its movement, in a similar manner bringing about a reversal anew of the movement of the number wheels or dials.

The reversal of the movement of the dials having been accomplished by a reversal of the direction of rotation of the operating shaft, it becomes necessary to provide means to rotate the longitudinal shaft 7 and the selector shafts 3 in the same direction, irrespective of the direction of rotation of the first-named shaft, and to this end the bevel drive gear 6' of the shaft 5 engages loose bevel gears 52 and 53 of the shaft 7, a clutch hub or member 54 being fast upon the last-named shaft, and provided upon each end face thereof with clutch teeth 55 and 56, of ratchet form, the hub of each of the gears, 52 and 53, carrying a spring-pressed pin 57, adapted to engage the teeth 55 and 56. Therefore, the said gears rotating constantly in mesh with the drive gear 6, and in opposite directions, one of these gears, for instance 52, will through its pin 57 engage the tooth 55 of the said clutch hub and cause the shaft 7 to rotate therewith, while the other of the gears will rotate idly, its pin 57 sliding over the incline of the tooth 56 of said hub.

It is further desirable to provide means for preventing a reversal of the rotation of the operating shaft in either direction, once its rotation is initiated, until the rotation is completed, and to this end advantage is taken of the reversing wheel 35 and the bell lever 42 aforesaid, forming a part of the means for reversing the movement of the dials, following a reversal of the movement of the crank handle, in that the reversing wheel is formed with a circumferential series of fine teeth 35' which are engaged by the tail end 48 of the bell lever, in the manner of a pawl. A slight reversal of the movement of the operating shaft will move the friction disk reversely, and thereby bring the end 48 of the bell lever into engagement with the circumferential teeth of the reverse wheel to stop the movement almost instantaneously.

The movement of the bell lever to pull the link 44 endwise and reverse the dials is accomplished as stated, by the engagement of the end 48 of said lever with the circumferential notch 47 of the reversing wheel, the latter fast to the operating shaft, thereby lessening the degree of contact between the friction disk and the reversing wheel that would be required were this contact relied upon to so move the bell lever and link 44; and in order to admit of the movement of the bell lever from normal position, disengaged from said wheel, to the position engaged with the notch 47, or with the teeth 35', it is necessary that the link 44 shall have a slight extra movement or play with relation to the rock lever 46, without actuation of said rock lever. The slot and pin connection 45 provides for this extra movement or play.

This extra movement being ended in one direction, and the end wall of the slot contacting with the pin of the connection 45, the bell lever will be actuated to shift the dials, and during the end portion of the shifting said lever will be moved slightly further, as stated, to bring its end 48 out of contact with the circumferential teeth of the reversing wheel. This slight further movement of the bell lever is brought about by the frictional contact of the disk 39 with the reversing wheel, and it then becomes necessary to provide some positive means, other than or in assistance to said frictional contact, to complete the shifting operation, and to this end a shoulder 58 of a laterally yielding spring 59 is engaged by an arm 60 of the rock lever 46, at the start of the shifting operation in either direction, and acting upon said arm, will throw or snap home said lever and the sleeves 19.

The shoulder of the spring 59 also serves to hold the sleeves 19 and the gears carried thereby in position as thrown to one side or the other.

I claim:—

1. In a calculating machine, number wheels having gears and rotatable in one direction to register sums and oppositely to register remainders, movable members having gears and shiftable to engage the respective gears with opposite sides of the gears of the number wheels, operating means for the number wheels, and means for shifting said members actuated automatically by said operating means.

2. In a calculating machine, number wheels rotatable in one direction to register sums and oppositely to register remainders selecting mechanism and carry mechanism rotatable in one direction only for registering both sums and remainders, and means for actuating said selecting mechanism, number wheels and carry mechanism as stated including an operating device movable in one direction for registering sums and oppositely for registering remainders.

3. In a calculating machine, number wheels having gears and rotatable in one direction to register sums and oppositely to register remainders, selecting mechanism and carry mechanism rotatable in one direction only for registering both sums and remainders, and means for actuating said selecting mechanism number wheels and carry mechanism as stated including an operating device movable in one direction for registering sums and oppositely for registering remainders, and members movable thereby and having gears adapted to engage opposite sides of the gears of the number wheels.

4. In a calculating machine, number wheels having gears and rotatable in one direction to register sums and oppositely to register remainders, selecting mechanism and carry mechanism rotatable in one direction only for registering both sums and remainders, and means for actuating said selecting mechanism, number wheels and carry mechanism as stated including an operating device movable in one direction for registering sums and oppositely for registering remainders, members movable thereby having gears and shiftable to engage the respective gears with opposite sides of the gears of the number wheels, and spring means for completing the shifting and for holding said members in position as shifted.

5. In a calculating machine, number wheels rotatable in one direction to register sums and oppositely to register remainders, selecting mechanism and carry mechanism rotatable in one direction only for registering both sums and remainders, and means for actuating said selecting mechanism, number wheels and carry mechanism as stated including an operating shaft rotatable in one direction for registering sums and oppositely for registering remainders, said actuating means being adapted to prevent reverse movement of the operating shaft in either direction until a rotation thereof is completed.

6. In a calculating machine, numeral wheels, means for rotating said wheels a portion of which has an invariable direction of operative movement and including an operating device movable selectively, governing means shiftable to change the direction of rotation of said wheels, and means for automatically shifting the governing means in the selected movement of said operating device.

7. In a calculating machine, numeral wheels, means for rotating said wheels a portion of which has an invariable direction of rotation and including an operating device rotatble in either of two directions, governing means shiftable to change the direction of rotation of said wheels, and means for automatically shifting the governing means in the change of direction of rotation of said operating device.

8. In a calculating machine, numeral wheels having gears, means for rotating said wheels, including gears having an invariable direction of rotation and an operating device rotatable in either of two directions, governing means shiftable to engage said last-named gears with the opposite sides of the numeral wheel gears, and means for automatically shifting the governing means in the change of direction of rotation of the operating device.

9. In a calculating machine, numeral wheels rotatable in one direction to register increments and oppositely to register decrements, selecting mechanism and carry mechanism having an invariable direction of operative movement in registering both increments and decrements, and means for actuating said selecting mechanism, number wheels and carry mechanism as stated including an operating device common thereto and movable in one direction for registering increments and oppositely for registering decrements.

10. In a calculating machine, numeral wheels having gears and rotatable in one direction to register increments and oppositely to register decrements, selecting mechanism and carry mechanism having an invariable direction of operative movement in registering both increments and decrements, and means for actuating said selecting mechanism, numeral wheels and carry mechanism as stated including an operating device common thereto and movable in one direction for registering increments and oppositely for registering decrements, and members movable thereby and having gears adapted to engage the opposite sides of the gears of the numeral wheels.

11. In a calculating machine, numeral wheels having gears and rotatable in one direction to register increments and oppositely to register decrements, selecting mechanism and carry mechanism having an invariable direction of operative movement in registering both increments and decrements, and means for actuating said selecting mechanism, numeral wheels and carry mechanism as stated including an operating device common thereto and movable in one direction for registering increments and oppositely for registering decrements, members movable thereby, having gears and shiftable to engage the respective gears with opposite sides of the gears of the numeral wheels, and spring means for completing the shifting and for holding said members in position as shifted.

12. In a calculating machine, numeral wheels having gears and rotatable in one direction to register increments and oppositely to register decrements, selecting mechanism and carry mechanism having an invariable direction of operative movement in registering both increments and decrements, and means for actuating said selecting mechanism, numeral wheels and carry mechanism as stated including an operating device common thereto and movable in one direction for registering increments and oppositely for registering decrements, members movable thereby, having gears and shiftable to engage the respective gears with opposite sides of the gears of the numeral wheels, and frictionally positioned positively driven shifting means.

13. In a calculating machine, numeral wheels having gears and rotatable in one direction to register increments and oppositely to register decrements, selecting mechanism and carry mechanism having an invariable direction of operative movement in registering both increments and decrements, and means for actuating said selecting mechanism, numeral wheels and carry mechanism as stated including an operating device common thereto and movable in one direction for registering increments and oppositely for registering decrements, a longitudinal shaft, a double-faced clutch member fast thereto, loose gears upon said longitudinal shaft having spring-pressed pins adapted for clutch engagement with opposite faces of said member, and a gear driven by said operating device and having constant engagement with said loose gears.

14. In a calculating machine, numeral wheels having gears and rotatable in one direction to register increments and oppositely to register decrements, selecting mechanism and carrying mechanism having an invariable direction of operative movement in registering both increments and decrements, and means for actuating said selecting mechanism, numeral wheels and carry mechanism as stated including an operating shaft rotatable in one direction in registering increments and oppositely in registering decrements, members shiftable to engage opposite sides of the gears of the numeral wheels, means for shifting said members including a wheel fast to the operating shaft and having a notch, a rock shaft, connecting means between the operating shaft and the rock shaft including a wheel fast to the former, a rock lever upon the rock shaft, a spring-pressed friction disk loose upon the operating shaft and engaging said fast wheel and having a crank extension, a bell lever, and a rod connected at one end to one arm of said bell lever and at its opposite end having a slot and pin connection with said rock lever, the other arm of said bell lever having a slot and pin connection with said crank extension, and at its terminal portion engaging said notch, and a spring acting upon said rock lever to complete the shifting and to hold said members in position as shifted.

15. In a calculating machine, numeral wheels rotatable in one direction to register increments and oppositely to register decrements, selecting mechanism and carry mechanism having an invariable direction of operative movement in registering both increments and decrements, and means for actuating said selecting mechanism, numeral wheels and carry mechanism as stated including an operating shaft rotatable in one direction for registering increments and oppositely for registering decrements, said actuating means being adapted to prevent reverse movement of the operating shaft in either direction until the rotation thereof is completed.

16. In a calculating machine, numeral wheels having gears and rotatable in one direction to register increments and oppositely to register decrements, selecting mechanism and carry mechanism having an invariable direction of operative movement in registering both increments and decrements, and means for actuating said selecting mechanism, numeral wheels and carry mechanism as stated including an operating shaft rotatable in one direction for registering increments and oppositely for registering decrements, members shiftable to engage opposite sides of the gears of the numeral wheels, means for shifting said members including a wheel fast to the operating shaft and having a notch, and a circumferential series of teeth, and a lever adapted to engage said notch and to engage said teeth to prevent reverse movement of said shaft in either direction until its rotation is completed.

17. In a calculating machine, numeral wheels having gears and rotatable in one direction to register increments and oppositely to register decrements, selecting mechanism and carry mechanism having an invariable direction of operative movement in registering both increments and decrements, and means for actuating said selecting mechanism, numeral wheels and carry mechanism as stated including an operating shaft rotatable in one direction for registering increments and oppositely for registering decrements, members shiftable to engage opposite sides of the gears of the numeral wheels, means for shifting said members including a wheel fast to the operating shaft and having a notch and circumferential teeth, a rock shaft, connecting means between the operating shaft and the rock shaft including a wheel fast to the former, a rock lever upon the rock shaft, a spring-pressed friction disk loose upon the operating shaft and engaging said fast wheel and having a crank extension, a bell lever, and a rod connected at one end to one arm of said bell lever and at its opposite end having a slot and pin connection with said rock lever, the other arm of said bell lever having a slot and pin connection with said crank extension and at its terminal portion being adapted to engage said teeth to prevent reverse movement of the operating shaft until its rotation in either direction is completed, said terminal portion being also adapted to engage said notch, and a spring acting upon said rock lever to complete the shifting and to hold said members in position as shifted.

In testimony whereof I affix my signature in presence of two witnesses.

EDGAR E. PHINNEY.

Witnesses:
J. RUOAMSE,
E. F. BRITTEN, Jr.